United States Patent [19]

Tausk

[11] Patent Number: 4,941,268

[45] Date of Patent: Jul. 17, 1990

[54] OIL LEVEL GAUGE

[75] Inventor: Edward F. Tausk, Downers Grove, Ill.

[73] Assignee: Navistar International Transportation Corp., Chicago, Ill.

[21] Appl. No.: 305,586

[22] Filed: Feb. 2, 1989

[51] Int. Cl.$^5$ .............................................. G01F 23/04
[52] U.S. Cl. .................................... 33/729; 116/227; 33/722
[58] Field of Search ............... 33/721, 722, 723, 724, 33/725, 726, 727, 728, 729, 730, 731; 73/290 B, 321; 116/109, 227

[56] References Cited

U.S. PATENT DOCUMENTS

| | | | |
|---|---|---|---|
| 2,039,965 | 5/1936 | Lees et al. | 33/731 |
| 2,127,835 | 8/1938 | Tower | 33/725 |
| 2,705,372 | 4/1955 | Cornell | 33/726 |
| 2,919,028 | 12/1959 | Janus | 33/722 |
| 3,488,855 | 1/1970 | Howe | 33/729 |
| 4,266,344 | 5/1981 | Richardson | 33/726 |
| 4,330,940 | 5/1982 | Leitgeb | 33/729 |
| 4,475,290 | 10/1984 | Colditz | 33/729 |
| 4,531,293 | 7/1985 | Grinoe | 33/729 |
| 4,831,877 | 5/1989 | Snow | 116/227 |

FOREIGN PATENT DOCUMENTS

| | | | |
|---|---|---|---|
| 0155143 | 10/1904 | Fed. Rep. of Germany | 33/722 |
| 0303076 | 12/1928 | United Kingdom | 33/727 |
| 0377306 | 7/1932 | United Kingdom | 33/722 |

*Primary Examiner*—Thomas B. Will
*Attorney, Agent, or Firm*—F. David AuBuchon; Dennis K. Sullivan

[57] ABSTRACT

An oil level gauge including an ullage rod that is segmented and retained as a unit by a tensioned cable and having a fluted surface in the fluid measuring area to assure accurate nonwiping reading of the oil level.

8 Claims, 3 Drawing Sheets

U.S. Patent    Jul. 17, 1990    Sheet 1 of 3    4,941,268
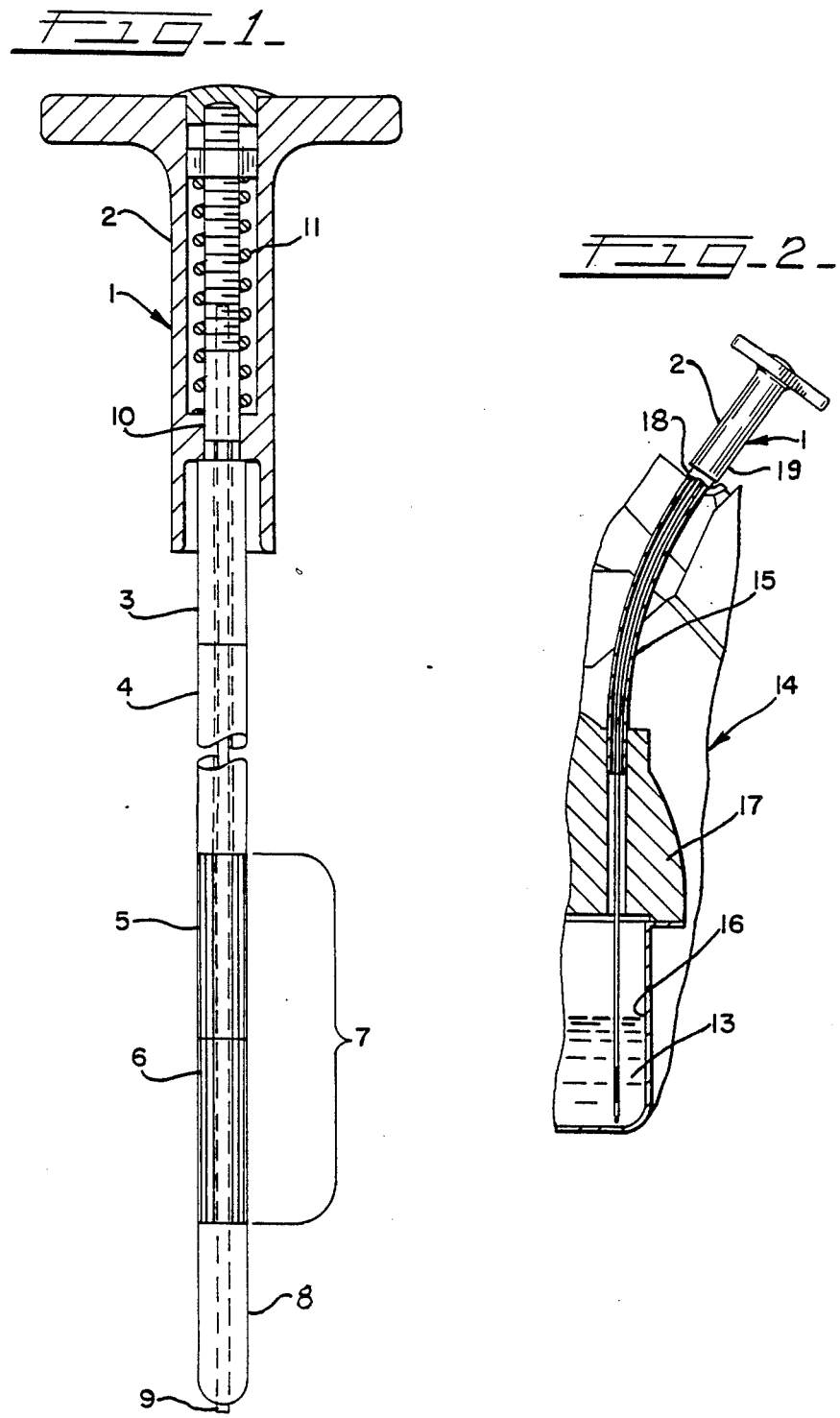

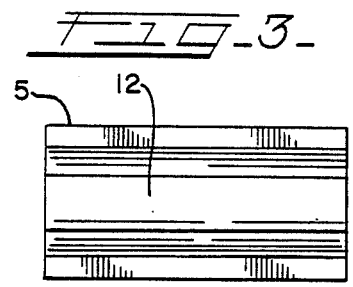
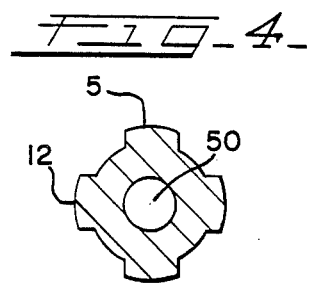
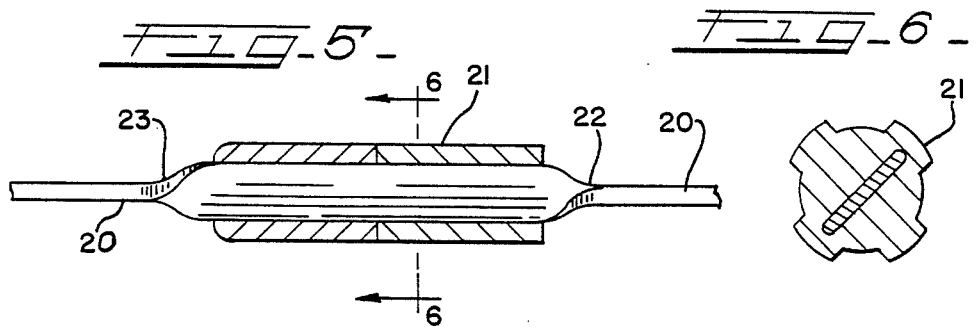
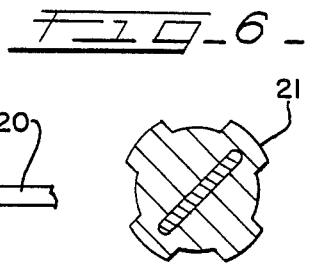
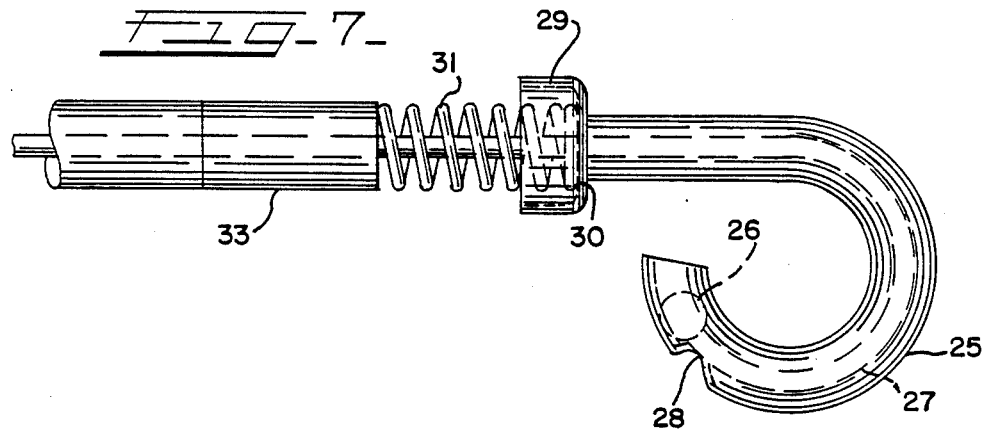
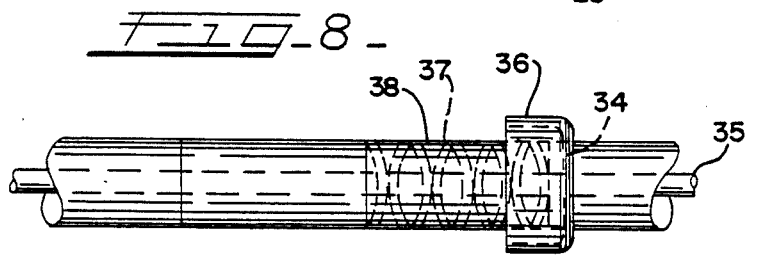

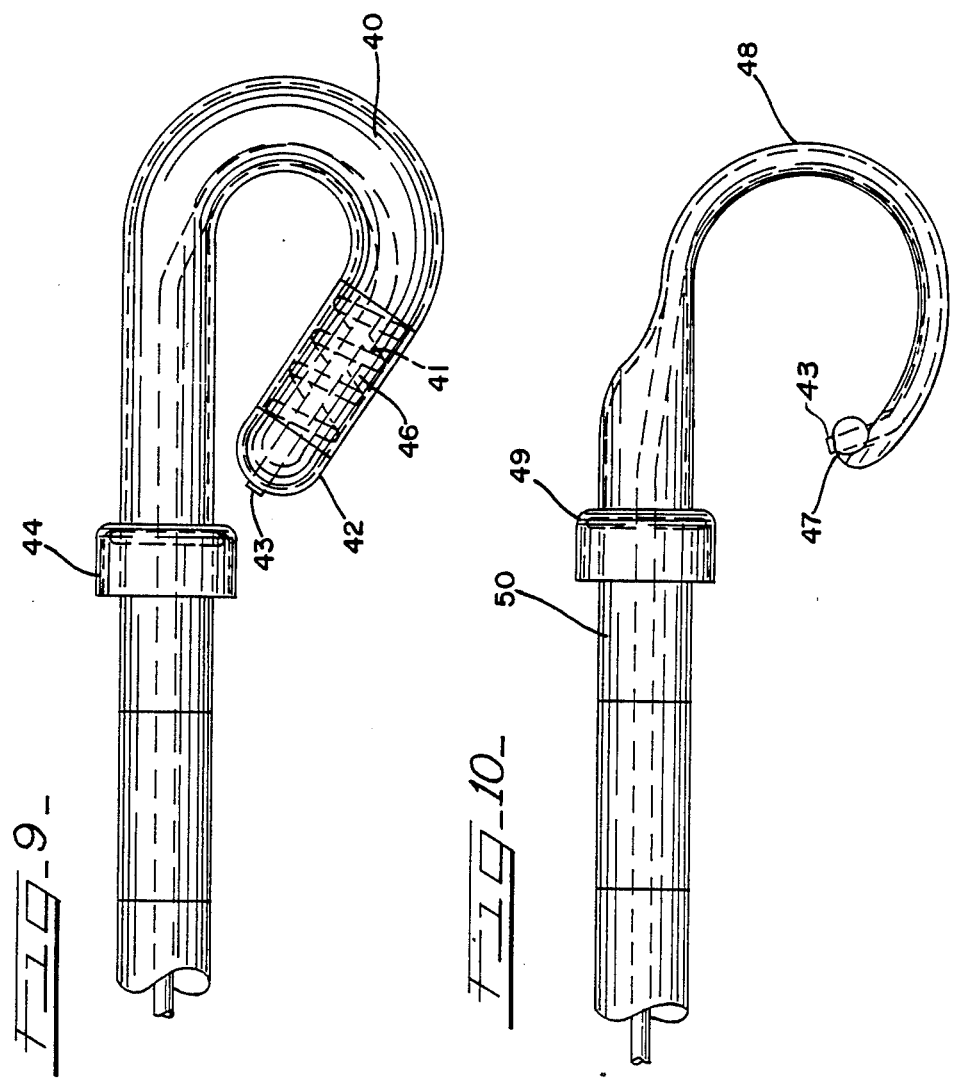

OIL LEVEL GAUGE

BACKGROUND OF THE INVENTION

This invention relates to a dip stick or ullage rod and, more particularly, to a segmented ullage rod held in an assembled position by a central tension cable and having a fluted measuring surface for accurate reading of the oil level.

The ullage rod in a conventional engine for measuring the oil level in the reservoir usually passes through a curved guiding tube as it is inserted in the engine. Accordingly, the rod must be flexible in order to be inserted in the operating position. In the process of reciprocating the ullage rod in the guiding tube, it may engage the inner peripheral surface of the guiding tube which may cause a smear when the ullage rod is retracted from the operating position to take a reading of the oil level. Accordingly, some provision must be made for preventing smearing of the oil on the rod which would prevent an accurate reading of the oil level. It is customary to remove the rod from its operating position and wipe the rod clean and reinsert it in the operating position to make a determination of the oil level.

THE PRIOR ART

Many conventional ullage rods are a flat stick which is inserted in the guiding passage for making a reading of the oil level. The Cornell patent U.S. No. 2,705,372 shows such a rod in which a flat ullage rod is used. To prevent the reading surface from engaging the inner periphery of the guide tube a protrusion is formed above and below the reading area. This prevents the reading surface of the ullage rod from engaging the inner periphery of the guide tube and allows an accurate reading of the oil level. The Howe patent U.S. No. 3,488,855 shows a flat ullage rod in which there is a twist in the rod immediately above and below the reading area which prevents the reading portion from engaging the inner periphery of the guide tube for insertion of the ullage rod in its operating position. These ullage rods are of a flat construction and can bend as they are inserted into the engine.

SUMMARY OF THE INVENTION

The present invention provides for a segmented rod with a central opening the length of the rod to receive a tensioned cable to maintain the rod as a unit. The outer periphery of the rod in the reading area is fluted to allow the oil to be retained in the grooves between the ridges in the fluted area to provide an accurate reading. The segmented construction of the rod allows the rod to bend in any direction and the fluting on the reading surface allows the oil indicating surface to retain oil and give an accurate reading while the ridges would prevent the oil from being wiped off the ullage rod in this area.

It is an object of this invention to provide a segmented ullage rod with a tensioned center cable to lock the segments in a unitary construction.

It is another object of this invention to provide a flexible ullage rod with a fluted peripheral surface in the reading area to provide an accurate reading.

It is a further object of this invention to provide a segmented flexible ullage rod with a fluted peripheral surface in the indicia area for providing accurate readings.

The objects of this invention are accomplished by a segmented ullage rod with a central opening running through the segments and extending throughout the length of the rod while receiving a tensioned cable for holding the segments in a unitary construction. A spring allows the segments to flex and the ullage rod to bend to accommodate any curvatures in the guide passage as the ullage rod is inserted or withdrawn from the engine. A fluted peripheral surface is provided on the ullage rod in the oil measuring area to provide an accurate reading. Accordingly, the ullage rod may flex in any plane to accommodate the curvature in the passage and the grooves in the fluted area provide an accurate reading.

DETAILED DESCRIPTION OF THE DRAWINGS

Referring to the drawings, a preferred embodiment of this invention is illustrated:

FIG. I is a plan view partly in section which illustrates the ullage rod in the assembled position.

FIG. 2 is an elevational view partly in section of a portion of an engine which illustrates the ullage rod in the operating position.

FIG. 3 illustrates a side view of a fluted segment of the ullage rod.

FIG. 4 is a sectional view of the fluted segment of the ullage rod.

FIG. 5 is a cross-section of a modification of the ullage rod mounted on a flat, flexible rod.

FIG. 6 is a cross-section of the rod shown in FIG. 5.

FIG. 7 is a plan view of a portion of the ullage rod of FIG. 1 having a first modification of the ullage rod end.

FIG. 8 is a plan view of a portion of the ullage rod of FIG. 1 having a second modification of the ullage rod end.

FIG. 9 is a plan view of a portion of the ullage rod of FIG. 1 having a third modification of the ullage rod end.

FIG. 10 is a plan view of a portion of the ullage rod of FIG. 1 having a fourth modification of the ullage rod end.

DESCRIPTION OF THE PREFERRED EMBODIMENT

Referring to the drawings, FIG. 1 shows a ullage rod 1 with a handle 2. The handle 2 is in abutting relation to the segment 3. The segment 3 is axially aligned with the segments 4, 5, 6, and 8. Segments 5 and 6 are fluted and form the oil measuring area 7. The segment 8 is swaged to the cable 9 and the opposite end of the cable is swaged to the plunger 10. The plunger 10 is spring biased by the spring 11 to place tension on the cable and maintain an axial alignment between the segments. Flexing of the rod to bend in any plane is allowed by the spring 11 and cable 9 which is drawn from the handle as the segments bend relative to each other.

FIGS. 3 and 4 show a segment with a fluted peripheral surface 12. The fluting of the segment can be seen in FIG. 4 in which the grooves would normally be partially filled with oil if they had extended into the oil reservoir 13 as shown on FIG. 2 when in a normal operating position. The central opening 50 permits the cable to extend through the segment.

FIG. 2 illustrates an engine 14 with a tubular sheath 15 operating as a ullage rod guide. It will be appreciated that the ullage rod of the invention would work equally well in measuring the oil level of a vehicle transmission or other devices having a fluid reservoir. The ullage rod 1 extends downwardly into the protective sheath structure 15 to the operating position as shown in which the lower end of the ullage rod extends into the oil 16 in the reservoir 13. The crankcase casting 17 of the engine provides a mounting for the sheath 15. The upper end 18 of the sheath 15 provides a stop for the cap 19 of the ullage rod 1.

FIGS. 5 and 6 show an alternative embodiment of the ullage rod in which a flat blade 20 is used to support a fluted sleeve 21. A 90 degree twist 22 above the fluted sleeve on the ullage rod and a 90 degree twist 23 below the fluted sleeve retains the fluted sleeve in its operating position on the blade 20. The fluted sleeve 21 may be used on a conventional blade type ullage rod if so desired.

FIGS. 7, 8, 9 and 10 show alternative constructions for the ullage rod end. A curved handle 25 is shown in FIG. 7 for the ullage rod. A ball 26 is connected to the cable 27 and locked in position by the dent 28 in the tubular handle of the ullage rod. The cap 29 is formed on the tubular rod and locked in position. A washer 30 is swaged on the cable and forms a spring seat for the spring 31. The spring 31 is compressibly positioned between the washer 30 and the segment 33. Flexing of the ullage rod will cause the compression of the spring.

FIG. 8 shows a similar arrangement in which a washer 34 is swaged to the cable 35 within the stop cap 36. The spring in this modification is constructed of a plurality of belleville washers 37 encapsulated in rubber 38. Operation of this ullage rod is the same as that of the ullage rod shown in FIG. 7. When the rod flexes, the spring is compressed and the rod is allowed to bend to accommodate any curves in the protective sheath as it is inserted or withdrawn from the operating position.

FIG. 9 shows a similar curved tubular handle 40 with a spring 41 in the end of the handle. The cap 42 is swaged to the cable 43. The cable extends in the tubular rod through the cap 44 and the segments of the rod which are all provided with a central opening to provide alignment when the cable is extended through all of the segments. Flexing of the ullage rod will cause compression of the spring 41 which is encased in rubber 46.

FIG. 10 shows a similar arrangement in whitch the cable is swaged in the ball 47. The ball 47 is locked in position and the handle 48 is constructed of spring steel which can flex when the ullage rod is bent. Straightening of the handle allows the ullage rod to flex and follow a curved path in the protective sheath as it is inserted or withdrawn from its operating position. The cap 49 is fastened to the ullage rod and the segment 50.

The ullage rod operates in the following manner. Because the segment 7 is swaged to the cable 9 as shown in FIG. 1 and also the plunger 10 is swaged to the cable on the opposite end, the tension of the cable by the spring 11 causes the segments to align in a straight axial position with each segment abutting the adjacent segment. The cable maintains this alignment and when the ullage rod is inserted in the engine to its operating position, it is allowed to flex by compressing the spring 10. The same is true when the ullage rod is withdrawn from the operating position to take a reading. In the normal operating position, the oil reading area extends into the oil reservoir and the oil level will appear on the fluted surface which is the indicia for a reading the oil depth in the engine.

Normally the ullage rod is in the reservoir in its operating position and when the reading is to be taken, the ullage rod is withdrawn and the oil reading surface is wiped clean with a cloth. The ullage rod is then reinserted in the engine as shown in FIG. 2 and the oil level will appear on the oil reading area. The ullage rod is then withdrawn and the reading is taken. Since the ridges prevent wiping of the oil in the grooves, an accurate reading can be taken. Once a reading has been made, the ullage rod is again inserted in the engine so it is available for subsequent use whenever needed.

What is claimed is:

1. An oil level measuring device comprising an ullage rod including a handle attached thereto for controlling said ullage rod, a plurality of axially aligned cylindrical segments having axially aligned openings therethrough including an end segment and a base segment, said segments being unattached to each other, said base segment engaging said handle, a tension cable extending from said handle through said base segment to said end segment through said openings, and a spring for tensioning said cable, said spring and cable being disposed to bias said segments into abutting relationship, at least one of said segments defining an oil reading surface for indicating the oil level.

2. An oil level measuring device as set forth in claim 1 including a peripheral surface on said rod segments, a fluted area on said peripheral surface of one of said rod segments providing the oil reading surface.

3. An oil level measuring device as set forth in claim 1 and said spring being operatively associated with said handle to tension said cable.

4. An oil level measuring device as set forth in claim 1 including a plunger in said handle connected to said cable and said spring being disposed in said handle and biasing said plunger to an extended position thereby tensioning said cable in said ullage rod.

5. An oil level measuring device comprising an ullage rod including a plurality of axially aligned segments having axial openings, said segments being unattached to each other, a handle connected to one end of said segments, a tensioned cable extending through said openings from said handle to an opposite end of said segments, a spring fastened to said handle for tensioning said cable, said spring and cable being disposed to bias said segments into abutting relationship, at least one of said segments defining an oil reading peripheral area for indicating the oil level.

6. An oil level measuring device as set forth in claim 5 including means defining a peripheral surface on said ullage rod segments, means defining a fluted surface on said peripheral surface of at least one segment, said fluted surface being operatively disposed along the length of said at least one segment to provide an oil level indication when inserted into a reservoir.

7. An oil level measuring device as set forth in claim 5 wherein said handle defines a cylindrical opening, a plunger received in said cylindrical opening, said spring biasing said plunger to an extended position, means connecting said cable to the plunger to thereby tension said cable and align said segments and said ullage rod.

8. An oil level measuring device as set forth in claim 5 and said spring biasing said cable to tension said cable to thereby align said segments in said ullage rod.

* * * * *